United States Patent
Tinney

(10) Patent No.: US 12,033,437 B2
(45) Date of Patent: Jul. 9, 2024

(54) ELECTRONIC VOTING DEVICES WITH MULTIPLE, FIXED VIEWING ANGLES AND METHODS FOR CONFIGURING SUCH DEVICES FOR STANDING AND SITTING VOTERS

(71) Applicant: Hart InterCivic, Inc., Austin, TX (US)

(72) Inventor: Drew E. Tinney, Austin, TX (US)

(73) Assignee: Hart InterCivic, Inc., Austin, TX (US)

( * ) Notice: Subject to any disclaimer, the term of this patent is extended or adjusted under 35 U.S.C. 154(b) by 100 days.

(21) Appl. No.: 17/988,878

(22) Filed: Nov. 17, 2022

(65) Prior Publication Data
US 2024/0169782 A1 May 23, 2024

(51) Int. Cl.
*G07C 13/00* (2006.01)
*G06F 1/16* (2006.01)

(52) U.S. Cl.
CPC ........... *G07C 13/00* (2013.01); *G06F 1/1626* (2013.01)

(58) Field of Classification Search
USPC ...................................... 235/51, 52
See application file for complete search history.

(56) References Cited

U.S. PATENT DOCUMENTS

| | | | |
|---|---|---|---|
| 7,344,071 B2 * | 3/2008 | Cummings | G07C 13/00 235/386 |
| 9,240,085 B2 | 1/2016 | Baumert et al. | |
| 2005/0061880 A1 | 3/2005 | Vanek et al. | |
| 2006/0138226 A1 | 6/2006 | McClure et al. | |
| 2010/0017274 A1 | 1/2010 | Liesenfelt | |

OTHER PUBLICATIONS

ES&S, Express Vote XL, "Full-Face Universal Voting System", 2021, 2 pgs.
ES&S, DS200, "Precinct Scanner & Tabulator", 2021, 2 pgs.
Project Vox, L.A. County & Ideo, Deliverable 5.2, BMD Appearance Model, Jul. 22, 2015, 16 pgs.

* cited by examiner

*Primary Examiner* — Kristy A Haupt
(74) *Attorney, Agent, or Firm* — Egan, Enders & Huston LLP.

(57) ABSTRACT

The present disclosure provides various embodiments of an electronic voting device that provides multiple, fixed viewing angles for viewing a display screen of the electronic voting device, and associated methods for configuring the electronic voting device for standing and sitting voters. The electronic voting device described in the present disclosure is positionable on a support surface in two fixed positions or orientations. When the electronic voting device is positioned on the support surface in a first device orientation (e.g., a standing orientation), the electronic voting device provides a first, fixed viewing angle that enables standing voters to optimally view the display screen. When the electronic voting device is positioned on the support surface in a second device orientation (e.g., a sitting orientation), the electronic voting device provides a second, fixed viewing angle that enables sitting voters to optimally view the display screen.

28 Claims, 6 Drawing Sheets

ELECTRONIC VOTING DEVICES WITH MULTIPLE, FIXED VIEWING ANGLES AND METHODS FOR CONFIGURING SUCH DEVICES FOR STANDING AND SITTING VOTERS

BACKGROUND OF THE INVENTION

The present disclosure relates to electronic voting devices and methods for displaying voting information to voters. More specifically, the present disclosure relates to improved electronic voting devices and methods that display voting information to standing and sitting voters at optimum viewing angles.

A wide variety of voting systems and processes are commonly used in federal, state, county and local elections. In some cases, a voter may utilize an electronic voting system or electronic voting device (collectively referred to herein as an "electronic voting device") located at a voting precinct or an official polling location to specify their voting preferences. Examples of electronic voting devices may include but are not limited to ballot marking devices (BMDs), voting terminals, voter interface devices, accessibility interfaces, voter-verified paper trail devices, tabulation devices, scanning devices, direct recording electronic (DRE) devices, hybrid paper/electronic voting devices, and a wide range of other devices used to present and/or input voting information to and/or from a voter. Electronic voting devices typically include a display screen for displaying voting information to the voter. Examples of voting information that may be displayed on the display screen include electronic ballots, instructions for utilizing electronic ballots, summaries of voting selections made by the voter on an electronic ballot, etc. In addition to voting information, the display screen may display various graphical user interface (GUI) components, which enable a voter to enter information, navigate through an electronic ballot, make voting selections on the electronic ballot and cast their vote once voting selections are reviewed and confirmed. In some cases, an electronic voting device may include a touch screen overlying the display screen for detecting touch input from the voter to enter information, navigate through the electronic ballot, enter voting selections, etc.

Electronic voting devices are typically deployed to polling locations in groups. Some of the electronic voting devices may be configured for use by standing users, while others must be usable by seated voters. Optimum viewing angles for a display/touch screen voting device varies widely between standing and seated voters. Viewing angles that deviate from the optimum viewing angles may impact both user comfort and touch screen accuracy, due to parallax (i.e., a displacement or difference in the apparent position of an object viewed along two different lines of sight). A single, fixed viewing angle is not suitable for the wide difference in viewing angles presented to standing and sitting voters.

Electronic voting devices have been developed to accommodate the needs of both standing and sitting voters. For example, some voting devices include a voter-adjustable display screen. These voting devices typically use a hinge (or other pivot mechanism) that allows the display screen of the voting device to be adjusted through a potentially wide range of viewing angles. There are many disadvantages with this approach. For example, the hinge must be robust enough to allow touch input without moving the display screen. This adds cost and complexity to the design. The hinge must also be easy to adjust for all voters, including voters with dexterity issues. This further drives up cost and complexity. Because hinges (and other pivot mechanisms) are moving parts, they may reduce reliability of the voting device by introducing a potential failure point. Finally, usability may be impacted when a previous voter leaves the display screen in a viewing angle, which is unsuitable for the next voter.

Other voting devices include an adjustable kickstand on the back of the device that allows the viewing angle of the voting device to be adjusted through a potentially wide range of angles. Similar to a hinge or pivot mechanism, an adjustable kickstand is a moving part, which may reduce reliability by increasing the likelihood of failure or damage. An adjustable kickstand may also be challenging for some users to adjust.

Other voting systems have been developed that provide a dedicated voting device (e.g., a disabled access unit) for voters with disabilities. There are many disadvantages with this approach. For example, disabled access units are typically designed under the assumption that voters with disabilities are seated. This is not always the case. While suitable for some voters, other voters with disabilities may not need to sit while voting and/or may not appreciate being forced to use different devices than the rest of the population. To accommodate voters with disabilities, election officials must deploy an appropriate number of disabled access units to each polling location. This requirement forces election officials to manage a more complex inventory. Because disabled access units cannot be adjusted on-the-fly, they cannot be adapted to changing traffic patterns.

A need exists for a single solution for all voters that is robust, reliable, easy to switch between viewing angles and simple for poll workers to setup up in the polling location.

SUMMARY OF THE INVENTION

The present disclosure provides various embodiments of an improved electronic voting device that provides multiple, fixed viewing angles for viewing a display screen of the electronic voting device, and associated methods for configuring the electronic voting device for standing and sitting voters. The electronic voting device described in the present disclosure is positionable on a support surface (e.g., a table, stand, cart, voting terminal or other substantially horizontal surface) in two fixed positions or device orientations. In each device orientation, the viewing angle of the display screen is optimized for a specific use. For example, when the electronic voting device is positioned on the support surface in a first device orientation (e.g., a standing orientation), the electronic voting device provides a first, fixed viewing angle that enables standing voters to optimally view the display screen and/or use the electronic voting device. When the electronic voting device is positioned on the support surface in a second device orientation (e.g., a sitting orientation), the electronic voting device provides a second, fixed viewing angle that enables sitting voters to optimally view the display screen and/or use the electronic voting device.

According to one embodiment, an electronic voting device in accordance with the present disclosure may generally include a chassis housing one or more electronic components of the electronic voting device, a display device integrated within the chassis, and a rear support structure fixedly attached to, or integrated with, the chassis for supporting the electronic voting device on a support surface. The display device may generally comprise a display screen for displaying voting information. The rear support structure may extend in a rearward direction behind the display screen at one or more non-adjustable angles, which enable the electronic voting device to provide multiple, fixed viewing angles for viewing the display screen and/or using the electronic voting device.

In some embodiments, the rear support structure may be a rear support stand, which is fixedly attached to, or integrated with, the chassis. In such embodiments, the rear support stand may extend in the rearward direction from at least one surface of the chassis at a non-adjustable angle. The non-adjustable angle is measured between a plane of the display screen and the rear support stand. In some embodiments, the non-adjustable angle may range between 15° and 165°.

In other embodiments, the rear support structure may be integrated with the chassis by configuring a rear surface of the chassis with a triangular shape, which provides a first angled support surface and a second angled support surface for supporting the electronic voting device on the support surface. In such embodiments, the first angled support surface may extend in the rearward direction from a top surface of the chassis at a first non-adjustable angle, while the second angled support surface extends in the rearward direction from a bottom surface of the chassis at a second non-adjustable angle. In some embodiments, the first non-adjustable angle may range between 15° and 45°, and the second non-adjustable angle may range between 45° and 75°.

In some embodiments, the electronic voting device may be positionable on the support surface in a first device orientation and a second device orientation, which differs from the first device orientation. In some embodiments, the electronic voting device may be rotated approximately 90° between the first device orientation and the second device orientation.

In some embodiments, the electronic voting device may be configured to provide: (a) a first viewing angle that enables a standing voter to view the display screen and/or use the electronic voting device when the electronic voting device is positioned on the support surface in the first device orientation; and (b) a second viewing angle that enables a sitting voter to view the display screen and/or use the electronic voting device when the electronic voting device is positioned on the support surface in the second device orientation. The first viewing angle and the second viewing angle are measured between a plane of the display screen and the support surface. In some embodiments, the first viewing angle may range between 15° and 45°, and the second viewing angle may range between 45° and 75°. In one example embodiment, the first viewing angle may be approximately 35° and the second viewing angle may be approximately 60°. In some embodiments, the electronic voting device may be repositioned from the first device orientation to the second device orientation, or vice versa, by rotating the electronic voting device by an angular amount equivalent to a sum of the first viewing angle and the second viewing angle.

In some embodiments, the chassis may comprise a front surface, a rear surface, a top surface and a bottom surface. In some embodiments, the rear surface of the chassis may comprise a first angled support surface adjacent to the top surface, and a second angled support surface adjacent to the bottom surface. One or more of the first angled support surface and the rear support structure may contact the support surface when the electronic voting device is positioned on the support surface in the first device orientation. One or more of the second angled support surface and the rear support structure may contact the support surface when the electronic voting device is positioned on the support surface in the second device orientation. In some embodiments, the first angled support surface may extend from the top surface of the chassis at a first support angle ranging between 15° and 45°, and the second angled support surface may extend from the bottom surface of the chassis at a second support angle ranging between 45° and 75°. When the first viewing angle is approximately 35° and the second viewing angle is approximately 60°, the first support angle may be approximately 60° and the second support angle may be approximately 35°.

In some embodiments, the display device may be configured to display voting information in: (a) a first display orientation when the electronic voting device is positioned on the support surface in the first device orientation; and (b) a second display orientation, which differs from the first display orientation, when the electronic voting device is positioned on the support surface in the second device orientation. In some embodiments, the second display orientation may differ from the first display orientation by 180°.

In some embodiments, the one or more electronic components of the electronic voting device may comprise a sensor and a controller. The sensor may be configured to obtain sensor data corresponding to: (a) the first device orientation when the electronic voting device is positioned on the support surface in the first device orientation, and (b) the second device orientation when the electronic voting device is positioned on the support surface in the second device orientation. The controller may be coupled to receive the sensor data and may be configured to automatically adjust a display orientation of the display device to display the voting information in: (a) the first display orientation when the sensor data corresponds to the first device orientation, and (b) the second display orientation when the sensor data corresponds to the second device orientation.

The electronic voting device described herein is a stand-alone device, which is not integrated with or fixedly attached to the support surface or other election voting system components. Examples of support surfaces include, but are not limited to, a table, stand, cart, voting terminal or other substantially horizontal surface. In some embodiments, the electronic voting device may be a ballot marking device (BMD) or a direct recording electronic (DRE) device.

According to another embodiment, a portable electronic voting device in accordance with the present disclosure may generally include a chassis, a display device integrated within the chassis, and a rear support stand fixedly attached to, or integrated with, the chassis for supporting the portable electronic voting device on a support surface. The chassis may house one or more electronic components of the portable electronic voting device. The display device may have a display screen for displaying voting information. The rear support stand may extend in a rearward direction from the chassis at a fixed, non-adjustable angle, which enables the portable electronic voting device to provide multiple, fixed viewing angles for viewing the display screen and/or using the portable electronic voting device. In this embodiment, the portable electronic voting device may be generally configured to provide: (a) a first viewing angle that enables a standing voter to view the display screen and/or use the portable electronic voting device when the portable electronic voting device is positioned on the support surface in a first device orientation; and (b) a second viewing angle that enables a sitting voter to view the display screen and/or use the portable electronic voting device when the portable electronic voting device is positioned on the support surface in a second device orientation, which differs from the first device orientation.

Various angles may be associated with the portable electronic voting device when the portable electronic voting device is positioned in the first device orientation and the second device orientation. As noted above, the portable electronic voting device may generally comprise a fixed, non-adjustable angle, a first viewing angle and a second viewing angle. The fixed, non-adjustable angle is measured between a plane of the display screen and the rear support stand. In some embodiments, the fixed, non-adjustable angle may range between 15° and 165°. The first viewing angle and the second viewing angle are measured between a plane of the display screen and the support surface. In some embodiments, the first viewing angle may range between 15° and 45° and the second viewing angle may range between 45° and 75°. In one example embodiment, the first viewing angle may be approximately 35° and the second viewing angle may be approximately 60°. In some embodiments, the portable electronic voting device may be rotated approximately 90° between the first device orientation and the second device orientation. In one example embodiment, the portable electronic voting device may be rotated 95° between the first device orientation and the second device orientation.

In some embodiments, the portable electronic voting device may further include a handle fixedly attached to, or integrated with, the chassis for carrying the portable electronic voting device. In some embodiments, the rear support stand may be formed integral with the handle. In some embodiments, the chassis may comprise a first side surface and a second side surface, and the handle may be fixedly attached to, or integrated with, the first side surface and the second side surface. In some embodiments, the rear support stand may be formed integral with the handle.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the disclosed concept and are therefore not to be considered limiting of its scope, for the disclosed concept may admit to other equally effective embodiments.

DESCRIPTION OF THE PREFERRED EMBODIMENTS

Figure 1A:
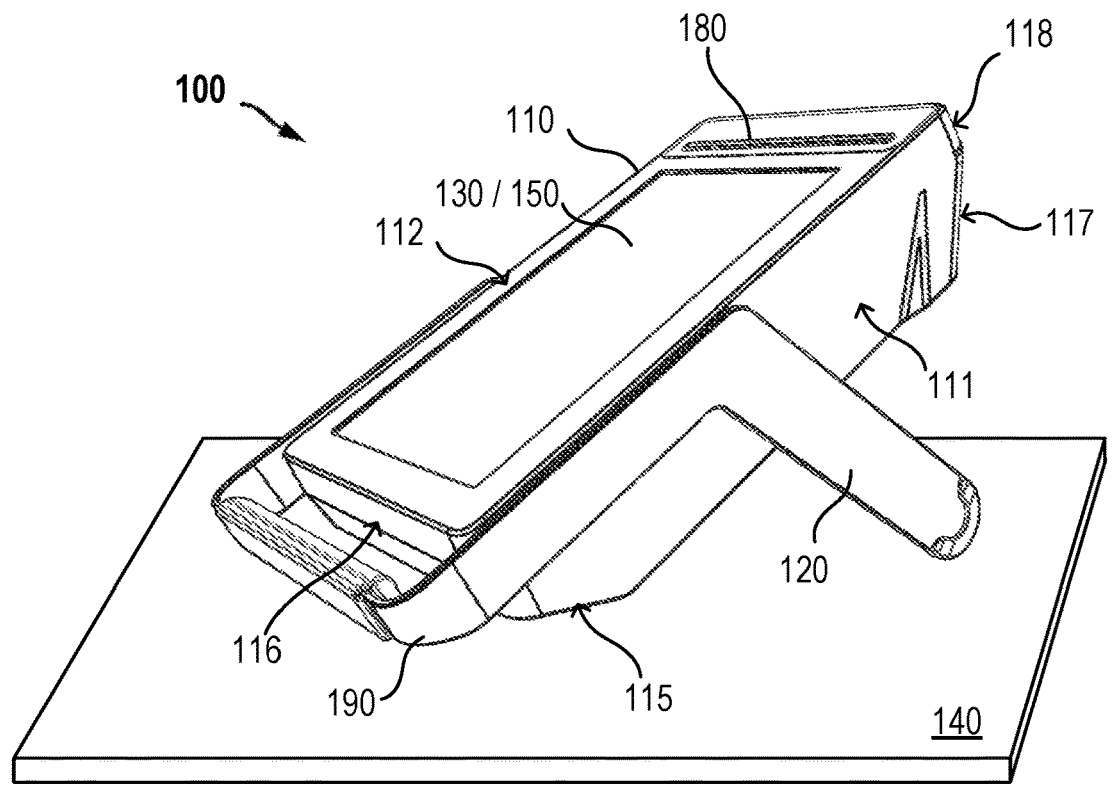
FIG. 1A is a front perspective view of an electronic voting device in accordance with one embodiment of the present disclosure, wherein the electronic voting device is positioned on a support surface in a first device orientation to provide a first viewing angle, which enables standing voters to view a display screen of the electronic voting device and/or use the electronic voting device.

The present disclosure provides various embodiments of an improved electronic voting device that provides multiple, fixed viewing angles for viewing a display screen of the electronic voting device, and associated methods for configuring the electronic voting device for standing and sitting voters. The electronic voting device described in the present disclosure is positionable on a support surface (e.g., a table, stand, cart, voting terminal or other substantially horizontal surface) in two fixed positions or device orientations. In each device orientation, the viewing angle of the display screen is optimized for a specific use. For example, when the electronic voting device is positioned on the support surface in a first device orientation (e.g., a standing orientation), the electronic voting device provides a first, fixed viewing angle that enables standing voters to optimally view the display screen and/or use the electronic voting device. When the electronic voting device is positioned on the support surface in a second device orientation (e.g., a sitting orientation), the electronic voting device provides a second, fixed viewing angle that enables sitting voters to optimally view the display screen and/or use the electronic voting device.

In the present disclosure, a rear support structure is fixedly attached to, or integrated with, a chassis of the electronic voting device for supporting the electronic voting device on the support surface. The rear support structure extends in a rearward direction behind the display screen at one or more non-adjustable angles, which enable the electronic voting device to provide multiple, fixed viewing angles for viewing the display screen. In one embodiment, the rear support structure may enable the electronic voting device to provide: (a) a first viewing angle (which enables standing voters to optimally view the display screen and/or use the electronic voting device) when the electronic voting device is positioned on the support surface in the first device orientation, and (b) a second viewing angle (which enables sitting voters to optimally view the display screen and/or use the electronic voting device) when the electronic voting device is positioned on the support surface in the second device orientation. The first and second viewings angle are measured between a plane of the display screen and the support surface. In one example embodiment, a first viewing angle of approximately 35° and a second viewing angle of approximately 60° may be utilized. It is noted, however, that the first and second viewing angles are not limited to such examples and may be selected from a wide range of angles, which are determined to be suitable for standing and sitting voters.

The electronic voting device disclosed herein can be easily repositioned on the support surface by rotating the electronic voting device between the first device orientation and the second device orientation. In some embodiments, the electronic voting device may be repositioned on the support surface by rotating the electronic voting device by an angular amount equivalent to a sum of the first viewing angle and the second viewing angle. In some embodiments, the electronic device may be repositioned from the first device orientation to the second device orientation (or vice versa) by rotating the electronic voting device approximately 90°. In one example embodiment, the electronic voting device may be rotated 95° when repositioned from the first device orientation to the second device orientation (or vice versa).

FIGS. 1A-1D illustrate one embodiment of an electronic voting device 100 in accordance with the present disclosure. As shown in FIGS. 1A-1D, the electronic voting device 100 may generally include a chassis 110 for housing various electronic components of the electronic voting device 100 and a rear support structure 120 that is fixedly attached to, or integrated with, the chassis 110 for supporting the electronic voting device 100 on a support surface 140.

A wide variety of electronic components may be housed within (or coupled to) the chassis 110. For example, a display device 130 may be integrated within the chassis 110, as shown in FIGS. 1A and 1C. The display device 130 may generally include a display screen configured to display information to a user. In some embodiments, the display device 130 may also include a touch screen 150 overlying the display screen for receiving and detecting touch input from the user. In some embodiments, the chassis 110 may include, or may be capable of interfacing with, additional input devices that allow a user to provide input to the electronic voting device 100. For example, the chassis 110 may include buttons, rollers, track pads or other user input features that enable a user to provide input to the electronic voting device 100. In addition or alternatively, the chassis 110 may include an input/output connector (such as, e.g., a USB port), which may be used to connect a peripheral input device to the electronic voting device 100. In one embodiment, an accessible tactile interface (ATI) or other disabled access unit (DAU) may be connected to an input/output connector on the chassis 110 to enable users with accessibility issues to provide input to, and interact with, the electronic voting device 100. The chassis 110 may also include a power connector for receiving power, a power switch for turning power on/off and a data input/output port for communicating data to other devices. In some embodiments, a paper input/output port 180 may be provided on the chassis 110 for receiving a blank ballot and/or for outputting a marked ballot or a printed record of the voter's voting selections. Other electronic components may also be housed without or coupled to the chassis 110, as described in more detail below.

The display device 130 may utilize any of a wide variety of display and touch screen technologies known in the art. In some embodiments, the display device 130 may be implemented as a liquid crystal display (LCD) device, a light-emitting diode (LED) display device, an LED backlit or side lit LCD device, a thin-film transistor (TFT) LCD device, an organic LED (OLED) display device, an AMO-LED display device, etc. Other display technologies known in the art and not specifically mentioned herein may also be used to implement the display device 130. In some embodiments, the display device 130 may also include a touch screen 150, as noted above. The touch screen 150 may utilize a resistive or capacitive touch screen overlay for receiving and detecting touch input from a user. Other touch screen technologies known in the art and not specifically mentioned herein may also be used to implement the touch screen 150.

The display device 130 may be configured to display a wide variety of information to the user. In some embodiments, the display device 130 may be configured to display voting information to a voter or an election official. Examples of voting information that may be displayed to a voter on the display device 130 include, but are not limited to, electronic ballots, instructions for utilizing electronic ballots, summaries of voting selections made by the voter on an electronic ballot, etc. In addition to voting information, the display device 130 may be configured to display various graphical user interface (GUI) components, which enable a voter to enter information, navigate through an electronic ballot, make voting selections on an electronic ballot and cast their vote once voting selections are reviewed and confirmed. Voting information utilized by election officials may also be displayed on the display device 130, such as equipment configuration options, ballot configuration options, etc. Although described in the context of voting, the display device 130 is not limited to displaying voting information to a voter or election official, and may be alternatively configured to display other types of information and/or GUI components to a user.

In some embodiments, the display device 130 may display voting information, so that the voter can make voting selections in an election. For example, the display device 130 may display an electronic ballot, which a voter may use to make voting selections in an election. The voter may utilize the touch screen 150 (and/or another input device) to mark their voting selections on the electronic ballot. Once voting selections are complete, a marked ballot or printed record of the voter's voting selections may be printed. In some embodiments, the marked ballot or printed record may be printed and output from the paper input/output port 180 provided on the chassis 110.

The electronic voting device 100 shown in FIGS. 1A-1D is a stand-alone device, which is designed to sit or rest on the support surface 140. The support surface 140 may be, for example, a table, stand, cart, voting terminal or other substantially horizontal surface. Unlike other voting devices, the electronic voting device 100 is not integrated with, or fixedly attached to, the support surface 140 or other election voting system components (such as, e.g., a ballot box, printer, scanner, tabulator, carrying case, etc.). In some embodiments, the electronic voting device 100 may be a ballot marking device (BMD) or a direct recording electronic (DRE) device.

Figure 1B:
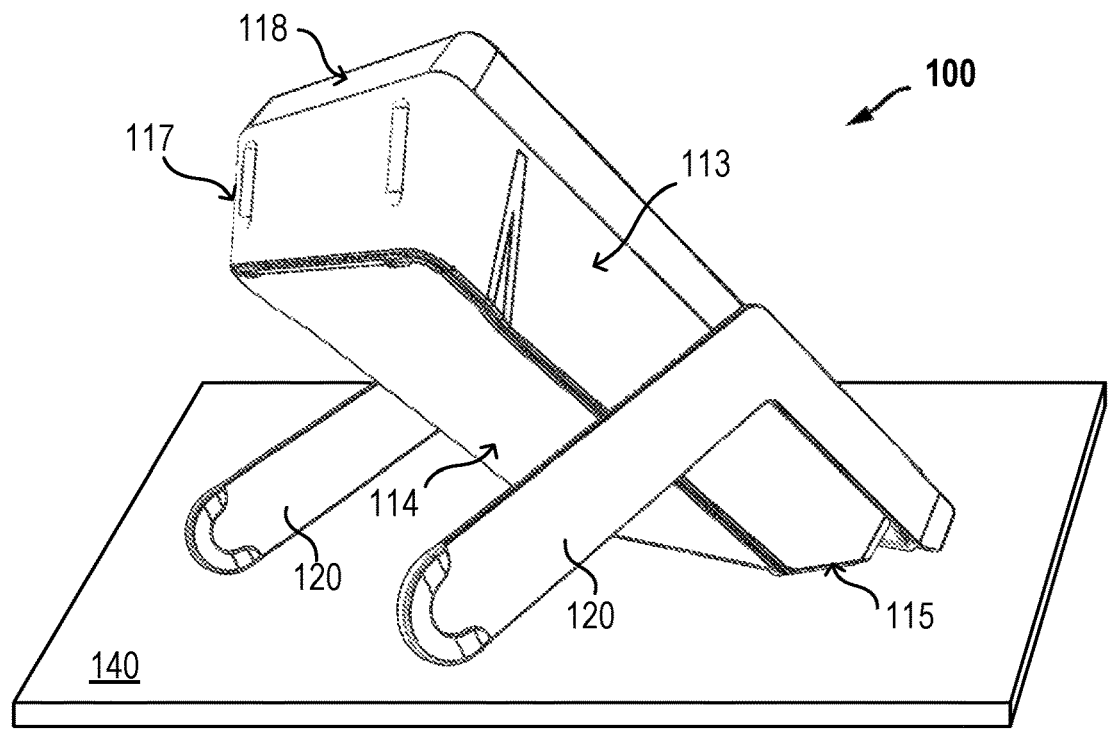
FIG. 1B is a rear perspective view of the electronic voting device when positioned in the first device orientation.
Figure 1C:
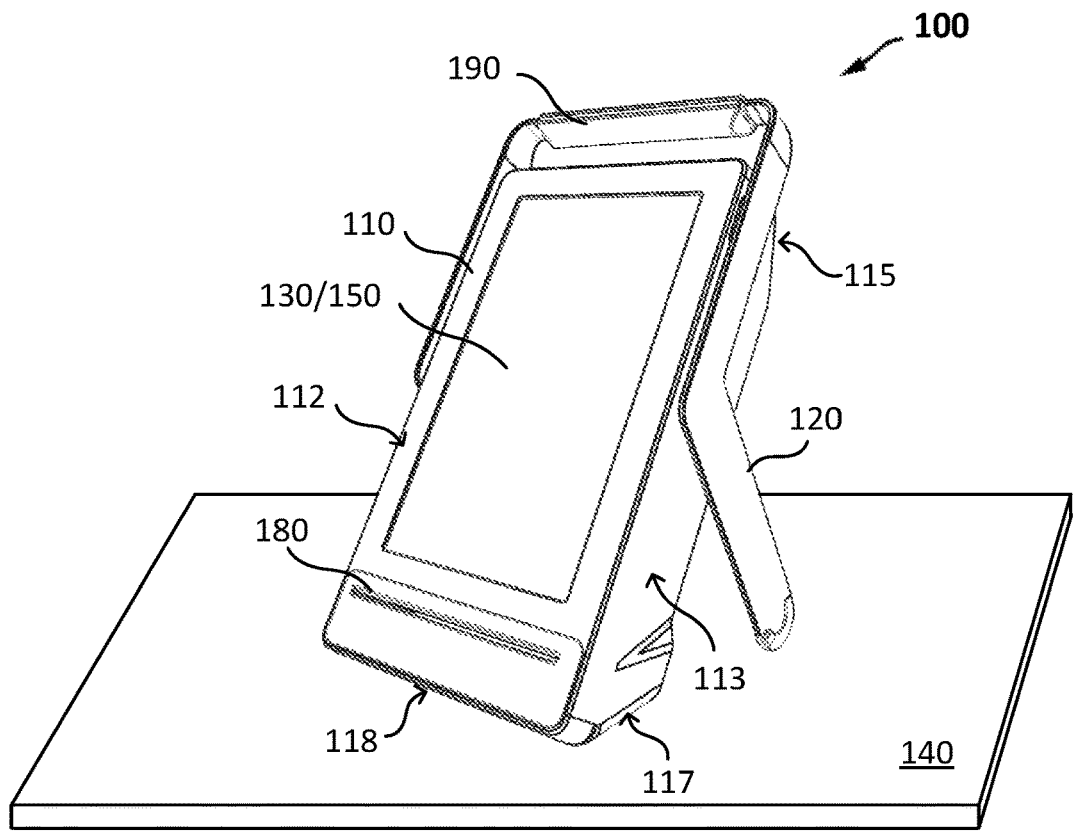
FIG. 1C is a front perspective view of the electronic voting device shown in FIGS. 1A-1B when the electronic voting device is positioned on a support surface in a second device orientation to provide a second viewing angle, which enables sitting voters to view the display screen of the electronic voting device and/or use the electronic voting device.
Figure 1D:
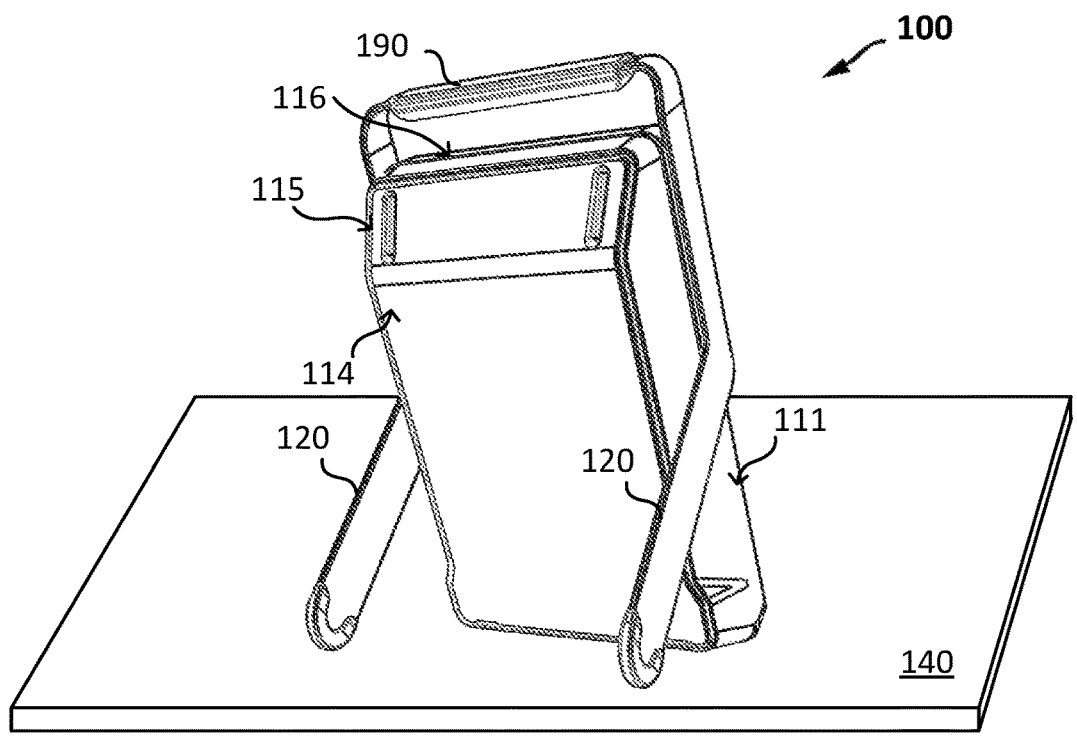
FIG. 1D is a rear perspective view of the electronic voting device when positioned in the second device orientation.

The electronic voting device 100 shown in FIGS. 1A-1D may be positioned on the support surface 140 in two different positions or device orientations, which are independently optimized for standing and sitting voters. In FIGS. 1A-1B, for example, the electronic voting device 100 is positioned on the support surface 140 in a first device orientation (e.g., a standing orientation) that provides a first viewing angle, which enables standing voters to optimally view the display screen of the display device 130 and/or to optimally use the electronic voting device 100 (such as, e.g., by providing touch input to the touch screen 150). In FIGS. 1C-1D, the electronic voting device 100 is positioned on the support surface 140 in a second device orientation (e.g., a sitting orientation) that provides a second viewing angle, which enables sitting voters to optimally view the display screen of the display device 130 and/or to optimally use the electronic voting device 100 (such as, e.g., by providing touch input to the touch screen 150). As described in more detail below with reference to FIGS. 3, 4A and 4B, the first and second viewing angles ($\beta_1$, $\beta_2$) may each be selected from a wide range of angles determined to be suitable for standing and sitting voters.

Figure 3:
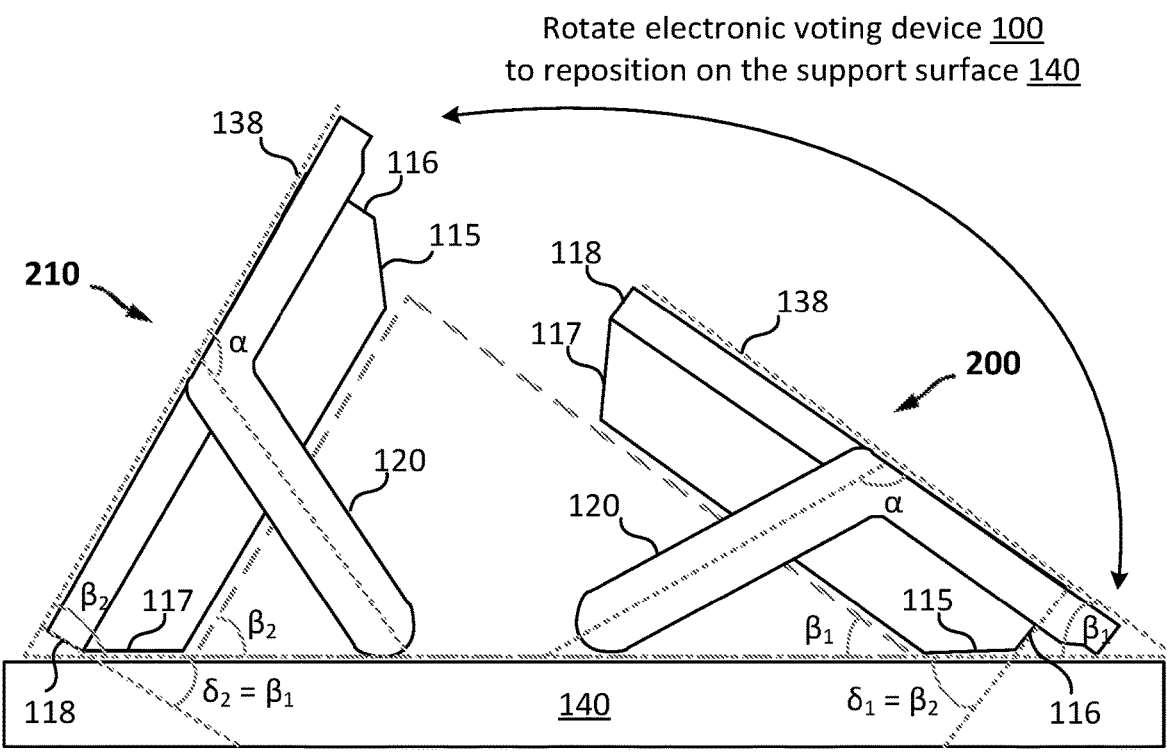
FIG. 3 is a simplified side view of the electronic voting device shown in FIGS. 1A-1D, illustrating how the electronic voting device can be positioned on the support surface in the first device orientation and the second device orientation.

As shown in FIG. 3 and described in more detail below, the electronic voting device 100 can be easily repositioned on the support surface 140 by rotating the electronic voting device 100 between the first device orientation and the second device orientation. In some embodiments, the electronic voting device 100 may be repositioned by rotating the electronic voting device 100 by an angular amount, which is equivalent to the sum of the first viewing angle ($\beta_1$) and the second viewing angle ($\beta_2$). In one example embodiment, the electronic device 100 may be repositioned from the first device orientation to the second device orientation (or vice versa) by rotating the electronic voting device 100 approximately 90°.

The display device 130 is configured to display voting information in different display orientations, depending on the orientation of the electronic voting device 100. For example, the display device 130 may be configured to display voting information in: (a) a first display orientation when the electronic voting device 100 is positioned on the support surface 140 in the first device orientation shown in FIGS. 1A-1B, and (b) a second display orientation when the electronic voting device 100 is positioned on the support surface 140 in the second device orientation shown in FIGS. 1C-1D. The second display orientation is different from the first display orientation. In some embodiments, the second display orientation may differ from the first display orientation by 180°.

Figure 2:
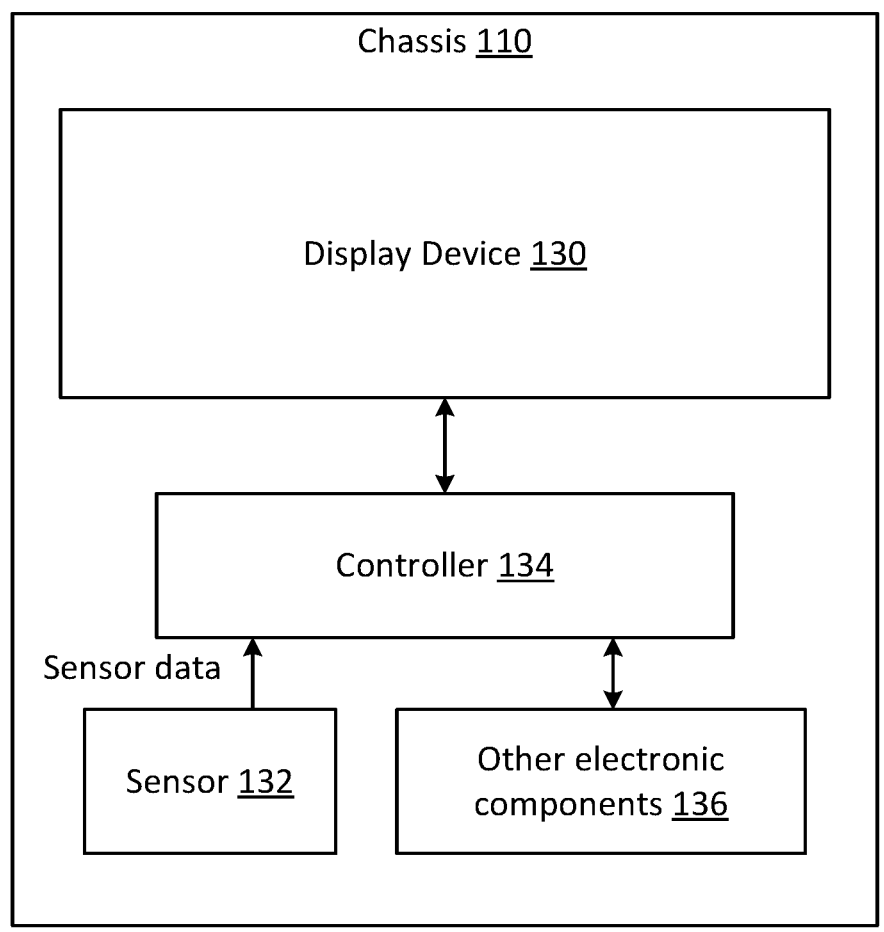
FIG. 2 is a block diagram illustrating various examples of electronic components that may be included within the electronic voting device shown in FIGS. 1A-1D.

In addition to display device 130, a wide variety of other electronic components may be housed within the chassis 110. The block diagram shown in FIG. 2 depicts example electronic components that may be included within the chassis 110. In some embodiments, the chassis 110 may include electronic components for detecting the orientation of the electronic voting device 100 and for automatically adjusting the display orientation of the voting information displayed on the display screen of the display device 130. For example, the electronic components may include a sensor 132 and a controller 134, as shown in FIG. 2. Other electronic components 136 may also be included within the chassis 110 for performing other functions.

The sensor 132 may be configured to obtain sensor data corresponding to the orientation of the electronic voting device 100. The sensor data collected by the sensor 132 may correspond to: (a) the first device orientation when the electronic voting device 100 is positioned on the support surface 140 in the first device orientation, and (b) the second device orientation when the electronic voting device 100 is positioned on the support surface 140 in the second device orientation. The controller 134 may be coupled to receive the sensor data from the sensor 132, and may be configured to automatically adjust the display orientation of the display device 130 in response thereto. In some embodiments, the controller 134 may analyze the sensor data to determine the orientation of the electronic voting device 100. Once the orientation of the electronic voting device 100 is determined, the controller 134 may automatically adjust the display orientation of the display device 130, so as to display the voting information in: (a) the first display orientation when the sensor data corresponds to the first device orientation, and (b) the second display orientation when the sensor data corresponds to the second device orientation.

The sensor 132 and the controller 134 may each be implemented using a variety of well-known components. For example, the sensor 132 may be an accelerometer, gyroscope or magnetometer. In some embodiments, the controller 134 may be a display controller, which is coupled to or integrated within the display device 130 for controlling various functions of the display device 130. In other embodiments, the controller 134 may be a separate controller, processing device or programmable integrated circuit, which is communicatively coupled to the display device 130 and other electronic components 136 included within the electronic voting device 100.

Unlike conventional voting devices, which utilize moving parts (e.g., an adjustable hinge, pivot mechanism or kickstand) to provide a voter-adjustable display screen that can be adjusted through a potentially wide range of viewing angles, the electronic voting device 100 includes a rear support structure 120 for supporting the electronic voting device 100 on the support surface 140. The rear support structure 120 disclosed herein may be fixedly attached to, or integrated with, the chassis 110. In addition, the rear support structure 120 may extend in a rearward direction behind the display screen at one or more fixed, non-adjustable angles, which enable the electronic voting device 100 to provide multiple, fixed viewing angles ($\beta_1$, $\beta_2$) for viewing the display screen of the display device 130. Providing the electronic voting device 100 with a fixed (i.e., non-adjustable) rear support structure 120 greatly improves usability and reliability by eliminating the moving parts commonly used in conventional voting devices to provide a voter-adjustable display screen.

The chassis 110 and the rear support structure 120 disclosed herein may be configured in a variety of different ways. One example embodiment of a chassis 110 and a rear support structure 120 is shown in FIGS. 1A-1D, 3 and 4A-4B. In the example embodiment shown in FIGS. 1A-1D, 3 and 4A-4B, the chassis 110 includes a front surface 112, a rear surface 114, a top surface 116 and a bottom surface 118. The rear surface 114 of the chassis 110 includes a first angled support surface 115 adjacent to the top surface 116 and a second angled support surface 117 adjacent to the bottom surface 118.

When the electronic voting device 100 is positioned on the support surface 140 in the first device orientation shown in FIGS. 1A-1B, 3 and 4A, the first angled support surface 115 and the rear support structure 120 are in contact with the support surface 140. When the electronic voting device 100 is positioned on the support surface 140 in the second device orientation shown in FIGS. 1C-1D, 3 and 4B, the second angled support surface 117 and the rear support structure 120 are in contact with the support surface 140. As described in more detail below with reference to FIGS. 3, 4A and 4B, the first angled support surface 115 may extend from the top surface 116 and the second angled support surface 117 may extend from the bottom surface 118 at a wide variety of angles ($\delta_1$, $\delta_2$), which enable the surfaces 115 and 117 to contact and rest securely on the support surface 140. In some embodiments, rubber feet may be provided on the first angled support surface 115 and the second angled support surface 117 to improve the stability of the electronic voting device 100 on the support surface 140.

In the example embodiment illustrated in FIGS. 1A-1D, 3 and 4A-4B, the rear support structure 120 is implemented as a rear support stand having a pair of support legs, which extend in a rearward direction from side surfaces 111, 113 of the chassis 110 at the fixed, non-adjustable angle ($\alpha$), which enables the electronic voting device 100 to provide multiple, fixed viewing angles ($\beta_1$, $\beta_2$) for viewing the display screen of the display device 130. In some embodiments, the rear support stand may be formed integral with a handle 190 of the electronic voting device 100, as shown in the figures. In the illustrated embodiment, the rear support stand and the handle 190 are fixedly attached to side surfaces 111, 113 of the chassis 110. It is noted, however, that the rear support structure 120 is not strictly limited to the example implementation shown in FIGS. 1A-1D, 3 and 4A-4B and may be alternatively implemented in other embodiments.

In some embodiments, for example, the rear support stand shown in FIGS. 1A-1D, 3 and 4A-4B may be formed separate from the handle 190 and may be separately attached to, or formed integral with, the chassis 110 in a different manner. In other embodiments, the pair of support legs shown in the figures may be connected together at distal ends of the support legs by a substantially horizonal support member, which may be configured to contact or rest upon the support surface 140. In yet other embodiments, a rear support structure 120 may be integrated within the chassis 110 of the electronic voting device 100 by providing the rear surface of the chassis 110 with an alternative shape. For example, a rear support structure 120 may be formed integral with the chassis 110 by configuring the rear surface of the chassis 110 with a substantially triangular shape, which provides a first angled support surface and a second angled support surface for supporting the electronic voting device 100 on the support surface 140. Thus, a rear support structure 120 fixedly attached to, or integrated with, the chassis 110 may encompass a wide range of implementations and configurations that provide: (a) support for the electronic voting device 100 on the support surface 140, and (b) multiple, fixed viewing angles ($\beta_1$, $\beta_2$) for viewing the display screen of the display device 130.

FIG. 3 illustrates how the electronic voting device 100 shown in FIGS. 1A-1D can be positioned on the support surface 140 in a first device orientation 200 and a second device orientation 210 to provide multiple, fixed viewing angles ($\beta_1$, $\beta_2$) for viewing the display screen and/or using the touch screen 150 of the display device 130. The electronic voting device 100 is positioned in the first device orientation 200 for standing voters. When the electronic voting device 100 is positioned in the first device orientation 200, the electronic voting device 100 provides a first viewing angle ($\beta_1$) that enables a standing voter to view the display screen and/or using the touch screen 150 of the display device 130. The electronic voting device 100 is positioned in the second device orientation 210 for sitting voters. When the electronic voting device 100 is positioned in the second device orientation 210, the electronic voting device 100 provides a second viewing angle ($\beta_2$) that enables a sitting voter to view the display screen and/or using the touch screen 150 of the display device 130.

As shown in FIG. 3, the first and second viewing angles ($\beta_1$, $\beta_2$) are measured between a plane 138 of the display screen and the support surface 140. The first and second viewing angles ($\beta_1$, $\beta_2$) may each be selected from a wide range of angles, which are determined to be suitable for standing and sitting voters. In some embodiments, the first viewing angle ($\beta_1$) may range between 15° and 45° and the second viewing angle ($\beta_2$) may range between 45° and 75°. In one example embodiment, the first viewing angle ($\beta_1$) may be approximately 35° and the second viewing angle ($\beta_2$) may be approximately 60° as shown, for example, in FIGS. 4A and 4B. Other viewing angles optimized for standing and sitting voters may also be utilized.

In the embodiment shown in FIG. 3, the rear support structure 120 is a rear support stand that extends in a rearward direction from at least one surface of the chassis 110 at a fixed, non-adjustable angle ($\alpha$), which is measured between the plane 138 of the display screen and the rear support structure 120. It is noted that the fixed, non-adjustable angle ($\alpha$) is not constrained by the viewing angles ($\beta_1$, $\beta_2$) nor the location of the points at which the rear support structure 120 makes contact with the support surface 140. Instead, the fixed, non-adjustable angle ($\alpha$) shown in FIG. 3 may vary over a wide range of angles without affecting the viewing angle (e.g., screen position) or the stability of the electronic voting device 100. In some embodiments, the fixed, non-adjustable angle ($\alpha$) may be selected from a wide variety of angles ranging between 15° and 165°. In one example embodiment, the fixed, non-adjustable angle ($\alpha$) may be approximately 116° as shown, for example, in FIGS. 4A and 4B. However, other non-adjustable angles ($\alpha$) may also be utilized when the electronic voting device 100 is provided with a rear support stand.

In the embodiment shown in FIG. 3, the electronic voting device 100 is supported on the support surface 140 by the rear support structure 120 (e.g., rear support stand) and the first angled support surface 115 when the electronic voting device 100 is positioned in the first device orientation 200. When the electronic voting device 100 is positioned in the second device orientation 210, the electronic voting device 100 is supported on the support surface 140 by the rear support structure 120 (e.g., rear support stand) and the second angled support surface 117.

As shown in FIG. 3, the first angled support surface 115 may extend from the top surface 116 of the chassis 110 at a first support angle ($\delta_1$), and the second angled support surface 117 may extend from the bottom surface 118 of the chassis 110 at a second support angle ($\delta_2$). The first support angle ($\delta_1$) and the second support angle ($\delta_2$) may each comprise a wide variety of angles, depending on the viewing angles ($\beta_1$, $\beta_2$) provided by the electronic voting device 100. In some embodiments, the first support angle ($\delta_1$) may be substantially equal to the second viewing angle ($\beta_2$) and the second support angle ($\delta_2$) may be substantially equal to the first viewing angle ($\beta_1$), as shown in FIG. 3. In some embodiments, the first support angle ($\delta_1$) may range between 15° and 45° and the second support angle ($\delta_2$) may range between 45° and 75°. In one example embodiment, the first support angle ($\delta_1$) may be approximately 60° and the second support angle ($\delta_2$) may be approximately 35° as shown, for example, in FIGS. 4A and 4B.

In other embodiments (not shown), a rear support structure may be integrated within the chassis 110 of the electronic voting device 100 by providing the rear surface of the chassis 110 with an alternative shape. For example, a rear surface of the chassis 110 may be configured with a substantially triangular shape, which provides a first angled support surface and a second angled support surface for supporting the electronic voting device 100 on the support surface 140. In one example embodiment, the rear surface of the chassis 110 may be provided with a substantially triangular shape by extending the first angled support surface 115 and the second angled support surface 117 shown in FIG. 3 along the plane of such surfaces until they connect. In such embodiments, the electronic voting device 100 may be supported on the support surface 140 by a first angled support surface (e.g., an extension of the first angled support surface 115) of the rear support structure when the electronic voting device 100 is positioned in the first device orientation 200. When the electronic voting device 100 is positioned in the second device orientation 210, the electronic voting device 100 may be supported on the support surface 140 by a second angled support surface (e.g., an extension of the second angled support surface 117) of the rear support structure. Alternative implementations and configurations of rear support surfaces may also be utilized.

As shown in FIG. 3, the electronic voting device 100 can be easily repositioned on the support surface 140 by rotating the electronic voting device 100 between the first device orientation 200 and the second device orientation 210. In some embodiments, the electronic voting device 100 may be repositioned by rotating the electronic voting device 100 by an angular amount equivalent to the sum of the first viewing angle ($\beta_1$) and the second viewing angle ($\beta_2$). In some embodiments, the electronic voting device 100 may be repositioned from the first device orientation 200 to the second device orientation 210 (or vice versa) by rotating the electronic voting device 100 approximately 90°. In one example embodiment, the electronic voting device 100 may be rotated 95° to reposition the electronic voting device 100.

Figure 4A:
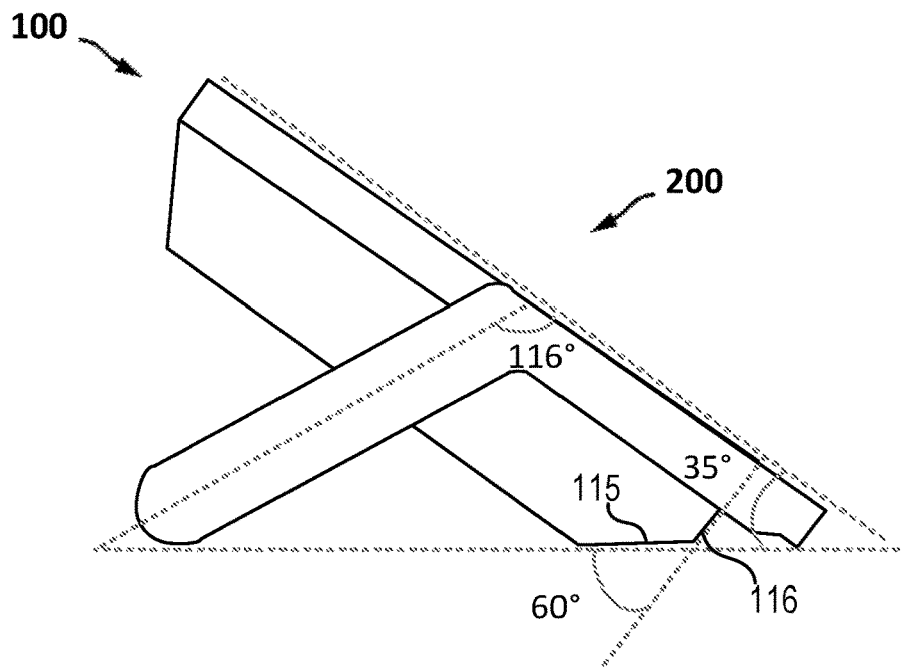
FIG. 4A is a simplified side view of the electronic voting device shown in FIGS. 1A-1D, illustrating various angles associated with the electronic voting device when the electronic voting device is positioned in the first device orientation.
Figure 4B:
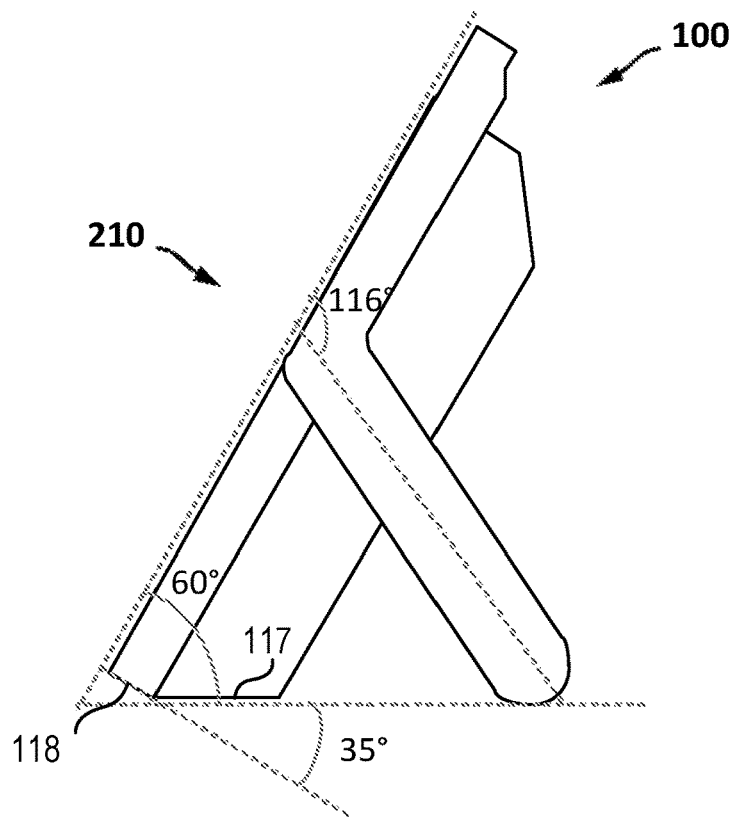
FIG. 4B is a simplified side view of the electronic voting device shown in FIGS. 1A-1D, illustrating various angles associated with the electronic voting device when the electronic voting device is positioned in the second device orientation.

FIGS. 4A-4B illustrate various angles associated with the electronic voting device 100 when the electronic voting device 100 is positioned in the first device orientation 200 and the second device orientation 210. For example, FIGS. 4A-4B provide an example fixed, non-adjustable angle ($\alpha$) for the rear support structure 120 (e.g., rear support stand), as well as example viewing angles ($\beta_1$, $\beta_2$) and support angles ($\delta_1$, $\delta_2$) that have may be optimized for standing and sitting voters. Although the non-adjustable angle ($\alpha$) is depicted to be 116° in FIGS. 4A-4B, other non-adjustable angles ($\alpha$) may also be used, as discussed further herein.

In some embodiments, the electronic voting device 100 may provide a first viewing angle ($\beta_1$) of approximately 35° when the electronic voting device 100 is positioned in the first device orientation 200 (e.g., the standing orientation), as shown in FIG. 4A. In some cases, a first viewing angle ($\beta_1$) of approximately 35° may provide an optimum viewing angle for standing voters to view the display screen and/or use the touch screen 150 of the display device 130. The first viewing angle ($\beta_1$) shown in FIG. 4A was specifically chosen as an optimal angle for standing American voters, based on demographic data available about standing height ranges in the adult American population. When a first viewing angle ($\beta_1$) of approximately 35° is utilized, the first support angle ($\delta_1$) between the first angled support surface 115 and the top surface 116 of the chassis 110 may be approximately 60°.

In some embodiments, the electronic voting device 100 may provide a second viewing angle ($\beta_2$) of approximately 60° when the electronic voting device 100 is positioned in the second device orientation 210 (e.g., the sitting orientation), as shown in FIG. 4B. In some cases, a second viewing angle ($\beta_2$) of approximately 60° may provide an optimum viewing angle for sitting voters to view the display screen and/or use the touch screen 150 of the display device 130. The second viewing angle ($\beta_2$) shown in FIG. 4B was specifically chosen as an optimal angle for sitting American voters, either in standard chairs or wheelchairs, based on demographic data available about seated height ranges in the adult American population. When a second viewing angle ($\beta_2$) of approximately 60° is utilized, the second support angle ($\delta_2$) between the second angled support surface 117 and the bottom surface 118 of the chassis 110 may be approximately 35°. Although example viewing angles and support angles are illustrated in FIGS. 4A and 4B, the electronic voting device 100 is not strictly limited to such angles and may include other angles optimized for standing and sitting voters.

In some embodiments, the electronic voting device 100 may further include a handle 190, which is fixedly attached to, or integrated with, the chassis 110 for carrying the electronic voting device 100, as shown in FIGS. 1A-1D. Including a handle 190 improves the portability of the electronic voting device 100. However, the electronic voting device 100 may also be sufficiently portable without the handle 190. In some embodiments, the handle 190 may be fixedly attached to, or integrated with, side surfaces of the chassis 110. For example, the handle 190 may be fixedly attached to (or integrated with) a first side surface 111 and a second side surface 113 of the chassis 110, as shown in FIGS. 1A-1D. It is noted, however, that the handle 190 is not strictly limited to such an implementation and may be alternatively attached to (or integrated with) the chassis 110 in other embodiments. In some embodiments, the rear support structure 120 may be a rear support stand, which is formed integral with the handle 190, as shown in FIGS. 1A-1D, 3 and 4A-4B and discussed above. Like the handle 190, however, the rear support structure 120 is not strictly limited to such an implementation and may be attached to, or integrated with, the chassis 110 in other ways.

The electronic voting device 100 shown in FIGS. 1A-1D, 3 and 4A-4B allows simple deployment and setup in one of two fixed device orientations, each optimized for a different use. The fixed device orientations optimize the screen angle of the electronic voting device 100 for one of two orientations commonly used for voting: seated and standing. The electronic voting device 100 needs no further configuration, setup or adjustments to be deployed in either orientation. When the electronic voting device 100 is repositioned from one device orientation to another, electronic components within the electronic voting device 100 detect the new device orientation and automatically rotate the display image to the correct display orientation.

The electronic voting device 100 improves upon conventional electronic voting devices by providing a simple solution for all voters and by eliminating moving parts. Unlike conventional electronic voting devices, which utilize moving parts (e.g., an adjustable hinge, pivot mechanism or kickstand) to provide a voter-adjustable display screen that can be adjusted through a potentially wide range of viewing angles, the electronic voting device 100 shown and described herein utilizes a non-adjustable, rear support structure 120 to provide multiple, fixed viewing angles ($\beta_1$, $\beta_2$) for viewing the display screen of the display device 130 and/or using the electronic voting device 100. By eliminating moving parts and reducing failure points, the electronic voting device 100 is more robust, more reliable and has a lower cost and complexity compared to conventional electronic voting devices.

In addition, the electronic voting device 100 is easier to set up and use than other voting devices. For example, the electronic voting device 100 enables a voter to choose whether to use the voting device in the first device orientation 200 configured for standing voters or the second device orientation 210 configured for sitting voters. This is an improvement for voters who find manipulating a hinge or pivot mechanism challenging. Because the electronic voting device 100 is easily repositioned from one device orientation to another, the electronic voting device 100: (a) does not force voters with disabilities or dexterity issues to use a different device (such as, e.g., a disabled access unit), (b) allows election officials to simplify inventory management by deploying identical voting devices at polling locations, and (c) allows the number of voting devices configured for standing vs. sitting positions to be adjusted on-the-fly at any time during the day, in order to better meet the needs of the voters. Other advantages not specifically mentioned herein may also be apparent to the skilled artisan.

Figure 5:
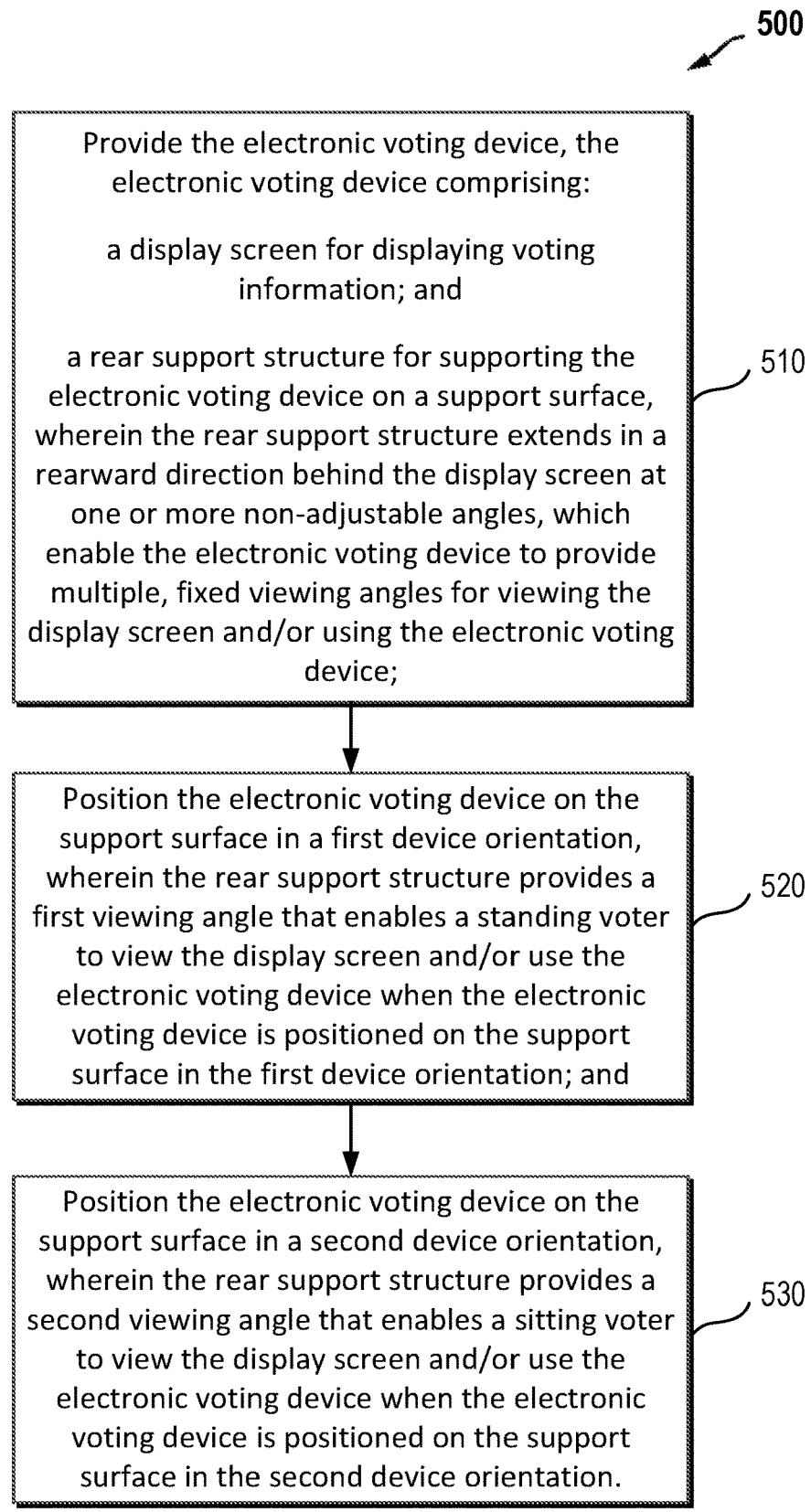
FIG. 5 is a flow chart diagram illustrating one embodiment of a method for configuring an electronic voting device for standing voters and sitting voters in accordance with the present disclosure.

FIG. 5 illustrates one embodiment of a method 500 for configuring an electronic voting device for standing voters and sitting voters in accordance with the present disclosure. The method 500 shown in FIG. 5 is a configuration method for an electronic voting device that includes at least a display screen for displaying voting information and a rear support structure for supporting the electronic voting device on a support surface. Examples of electronic voting devices that may be configured using method 500 are shown in FIGS. 1A-1D, 2, 3 and 4A-4B and described above. Although example configurations are provided herein, one skilled in the art having the benefit of this disclosure would understand how other electronic voting devices having at least a display device and a rear support structure, as described herein, may be used in method 500.

It will be recognized that the embodiment shown in FIG. 5 is exemplary and additional methods may utilize the techniques described herein. Further, additional steps may be added to the method shown in the FIG. 5 as the steps described are not intended to be exclusive. Moreover, the order of the steps is not limited to the order shown in FIG. 5 as different orders may occur and/or various steps may be performed in combination or at the same time.

The method 500 shown in FIG. 5 may generally begin by providing an electronic voting device having a display screen for displaying voting information and a rear support structure for supporting the electronic voting device on a support surface (in step 510). As noted above, the rear support structure may be fixedly attached to, or integrated with, a chassis of the electronic voting device for supporting the electronic voting device on the support surface. The rear support structure may also extend in a rearward direction behind the display screen of the electronic voting device at one or more non-adjustable angles to provide multiple, fixed viewing angles ($\beta_1$, $\beta_2$) for viewing the display screen and/or using the electronic voting device. The method 500 may further include positioning the electronic voting device on the support surface in a first device orientation (in step 520) and positioning the electronic voting device on the support surface in a second device orientation (in step 530). When the electronic voting device is positioned on the support surface in the first device orientation (in step 520), the rear support structure provides a first viewing angle (131) that enables a standing voter to view the display screen and/or use the electronic voting device. When the electronic voting device is positioned on the support surface in the second device orientation (in step 530), the rear support structure provides a second viewing angle ($\beta_2$) that enables a sitting voter to view the display screen and/or use the electronic voting device.

As noted above, the first and second viewing angles ($\beta_1$, $\beta_2$) may each be selected from a wide range of angles determined to be suitable for standing and sitting voters. In some embodiments, the first viewing angle ($\beta_1$) may range between 15° and 45° and the second viewing angle ($\beta_2$) may range between 45° and 75°. In one example embodiment, the first viewing angle ($\beta_1$) may be approximately 35° and the second viewing angle ($\beta_2$) may be approximately 60°, as shown in FIGS. 4A and 4B. Other viewing angles optimized for standing and sitting voters may also be utilized.

In some embodiments, the method 500 may position the electronic voting device on the support surface in the first device orientation (in step 520) before positioning the electronic voting device on the support surface in the second device orientation (in step 530), as shown in FIG. 5. In other embodiments, method steps 520 and 530 may be reversed.

In some embodiments, the method 500 may further include rotating the electronic voting device approximately 90° from the first device orientation to the second device orientation to position the electronic voting device on the support surface in the second device orientation (in step 530). In other embodiments, the method 500 may further include rotating the electronic voting device approximately 90° from the second device orientation to the first device orientation to position the electronic voting device on the support surface in the first device orientation (in step 520).

In some embodiments, the method 500 may further include obtaining sensor data corresponding to an orientation of the electronic voting device during said positioning the electronic voting device on the support surface in the first device orientation (step 520) and during said positioning the electronic voting device on the support surface in the second device orientation (step 530). In such embodiments, the method 500 may further include automatically adjusting a display orientation of the voting information displayed on the display screen to display the voting information in: (a) a first display orientation when the sensor data corresponds to the first device orientation, and (b) a second display orientation when the sensor data corresponds to the second device orientation. In some embodiments, the second display orientation may differ from the first display orientation by 180°.

Other advantages may be apparent to those skilled in the art in view of this description. In addition, further modifications and alternative embodiments of the inventions described herein will be apparent to those skilled in the art in view of this description. Accordingly, this description is to be construed as illustrative only and is for the purpose of teaching those skilled in the art the manner of carrying out the inventions. It is to be understood that the forms and methods of the inventions herein shown and described are to be taken as presently preferred embodiments. Equivalent techniques may be substituted for those illustrated and described herein and certain features of the inventions may be utilized independently of the use of other features, all as would be apparent to one skilled in the art after having the benefit of this description of the inventions.

What is claimed is:

1. An electronic voting device, comprising:
   a chassis, the chassis housing one or more electronic components of the electronic voting device;
   a display device integrated within the chassis, the display device having a display screen for displaying voting information; and
   a rear support structure fixedly attached to, or integrated with, the chassis for supporting the electronic voting device on a support surface, wherein the rear support structure extends in a rearward direction behind the display screen at one or more non-adjustable angles, which enable the electronic voting device to provide multiple, fixed viewing angles for viewing the display screen and/or using the electronic voting device;
   wherein the electronic voting device is a stand-alone device, which is not integrated with or fixedly attached to the support surface.

2. The electronic voting device of claim 1, wherein the rear support structure is a rear support stand, which is fixedly attached to, or integrated with, the chassis, and wherein the rear support stand extends in the rearward direction from at least one surface of the chassis at a non-adjustable angle.

3. The electronic voting device of claim 2, wherein the non-adjustable angle is measured between a plane of the display screen and the rear support stand, and wherein the non-adjustable angle ranges between 15° and 165°.

4. The electronic voting device of claim 1, wherein the rear support structure is integrated with the chassis by configuring a rear surface of the chassis with a triangular shape, which provides a first angled support surface and a second angled support surface for supporting the electronic voting device on the support surface, wherein the first angled support surface extends in the rearward direction from a top surface of the chassis at a first non-adjustable angle, and wherein the second angled support surface extends in the rearward direction from a bottom surface of the chassis at a second non-adjustable angle.

5. The electronic voting device of claim 4, wherein the first non-adjustable angle ranges between 15° and 45°, and wherein the second non-adjustable angle ranges between 45° and 75°.

6. The electronic voting device of claim 1, wherein the electronic voting device is positionable on the support surface in a first device orientation and a second device orientation, which differs from the first device orientation.

7. The electronic voting device of claim 6, wherein the electronic voting device is rotated approximately 90° between the first device orientation and the second device orientation.

8. The electronic voting device of claim 6, wherein the electronic voting device is configured to provide:
a first viewing angle that enables a standing voter to view the display screen and/or use the electronic voting device when the electronic voting device is positioned on the support surface in the first device orientation; and
a second viewing angle that enables a sitting voter to view the display screen and/or use the electronic voting device when the electronic voting device is positioned on the support surface in the second device orientation; and
wherein the first viewing angle and the second viewing angle are measured between a plane of the display screen and the support surface.

9. The electronic voting device of claim 8, wherein the first viewing angle ranges between 15° and 45°, and wherein the second viewing angle ranges between 45° and 75°.

10. The electronic voting device of claim 8, wherein the first viewing angle is approximately 35° and the second viewing angle is approximately 60°.

11. The electronic voting device of claim 8, wherein the electronic voting device is repositioned from the first device orientation to the second device orientation, or vice versa, by rotating the electronic voting device by an angular amount equivalent to a sum of the first viewing angle and the second viewing angle.

12. The electronic voting device of claim 6, wherein the chassis comprises a front surface, a rear surface, a top surface and a bottom surface, and wherein the rear surface of the chassis comprises:
a first angled support surface adjacent to the top surface, wherein one or more of the first angled support surface and the rear support structure contact the support surface when the electronic voting device is positioned on the support surface in the first device orientation; and
a second angled support surface adjacent to the bottom surface, wherein one or more of the second angled support surface and the rear support structure contact the support surface when the electronic voting device is positioned on the support surface in the second device orientation.

13. The electronic voting device of claim 12, wherein the first angled support surface extends from the top surface of the chassis at a first support angle ranging between 15° and 45°, and wherein the second angled support surface extends from the bottom surface of the chassis at a second support angle ranging between 45° and 75°.

14. The electronic voting device of claim 13, wherein the first viewing angle is approximately 35° and the second viewing angle is approximately 60°, and wherein the first support angle is approximately 60° and the second support angle is approximately 35°.

15. The electronic voting device of claim 6, wherein the display device is configured to display voting information in:
a first display orientation when the electronic voting device is positioned on the support surface in the first device orientation; and
a second display orientation, which differs from the first display orientation, when the electronic voting device is positioned on the support surface in the second device orientation.

16. The electronic voting device of claim 15, wherein the second display orientation differs from the first display orientation by 180°.

17. The electronic voting device of claim 15, wherein the one or more electronic components of the electronic voting device comprise:
a sensor configured to obtain sensor data corresponding to: (a) the first device orientation when the electronic voting device is positioned on the support surface in the first device orientation, and (b) the second device orientation when the electronic voting device is positioned on the support surface in the second device orientation; and
a controller coupled to receive the sensor data and configured to automatically adjust a display orientation of the display device to display the voting information in: (a) the first display orientation when the sensor data corresponds to the first device orientation, and (b) the second display orientation when the sensor data corresponds to the second device orientation.

18. The electronic voting device of claim 1, wherein the electronic voting device is a ballot marking device (BMD) or a direct recording electronic (DRE) device.

19. The electronic voting device of claim 1, wherein the electronic voting device is not integrated with or fixedly attached to other election voting system components.

20. The electronic voting device of claim 1, wherein the support surface is a table, stand, cart, voting terminal or other substantially horizontal surface.

21. A portable electronic voting device, comprising:
a chassis, the chassis housing one or more electronic components of the portable electronic voting device;
a display device integrated within the chassis, the display device having a display screen for displaying voting information; and
a rear support stand fixedly attached to, or integrated with, the chassis for supporting the portable electronic voting device on a support surface, wherein the rear support stand extends in a rearward direction from the chassis at a fixed, non-adjustable angle, which enables the portable electronic voting device to provide multiple, fixed viewing angles for viewing the display screen and/or using the portable electronic voting device;

wherein the portable electronic voting device is configured to provide:
- a first viewing angle that enables a standing voter to view the display screen and/or use the portable electronic voting device when the portable electronic voting device is positioned on the support surface in a first device orientation; and
- a second viewing angle that enables a sitting voter to view the display screen and/or use the portable electronic voting device when the portable electronic voting device is positioned on the support surface in a second device orientation, which differs from the first device orientation.

22. The portable electronic voting device of claim 21, wherein the fixed, non-adjustable angle is measured between a plane of the display screen and the rear support stand, and wherein the fixed, non-adjustable angle ranges between 15° and 165°.

23. The portable electronic voting device of claim 21, wherein the first viewing angle and the second viewing angle are measured between a plane of the display screen and the support surface, and wherein the first viewing angle ranges between 15° and 45° and the second viewing angle ranges between 45° and 75°.

24. The portable electronic voting device of claim 23, wherein the first viewing angle is approximately 30° and the second viewing angle is approximately 60°.

25. The portable electronic voting device of claim 24, wherein the portable electronic voting device is rotated approximately 90° between the first device orientation and the second device orientation.

26. The portable electronic voting device of claim 21, further comprising a handle fixedly attached to, or integrated with, the chassis for carrying the portable electronic voting device.

27. The portable electronic voting device of claim 26, wherein the rear support stand is formed integral with the handle.

28. The portable electronic voting device of claim 26, wherein the chassis comprises a first side surface and a second side surface, and wherein the handle is fixedly attached to, or integrated with, the first side surface and the second side surface.

* * * * *